(No Model.)

E. MAJOR.
LUBRICATOR.

No. 543,696.  Patented July 30, 1895.

Witnesses:
H. E. Bates
A. N. Bowman

Inventor,
Emanuel Major
By Howard L. Osgood
Atty.

UNITED STATES PATENT OFFICE.

EMANUEL MAJOR, OF ROCHESTER, NEW YORK.

LUBRICATOR.

SPECIFICATION forming part of Letters Patent No. 543,696, dated July 30, 1895.

Application filed August 12, 1893. Serial No. 483,036. (No model.)

*To all whom it may concern:*

Be it known that I, EMANUEL MAJOR, a citizen of the United States, and a resident of the city of Rochester, in the county of Monroe and State of New York, have invented certain new and useful Improvements in Lubricators, of which the following is a specification, reference being had to the accompanying drawings, in which—

Figure 1:
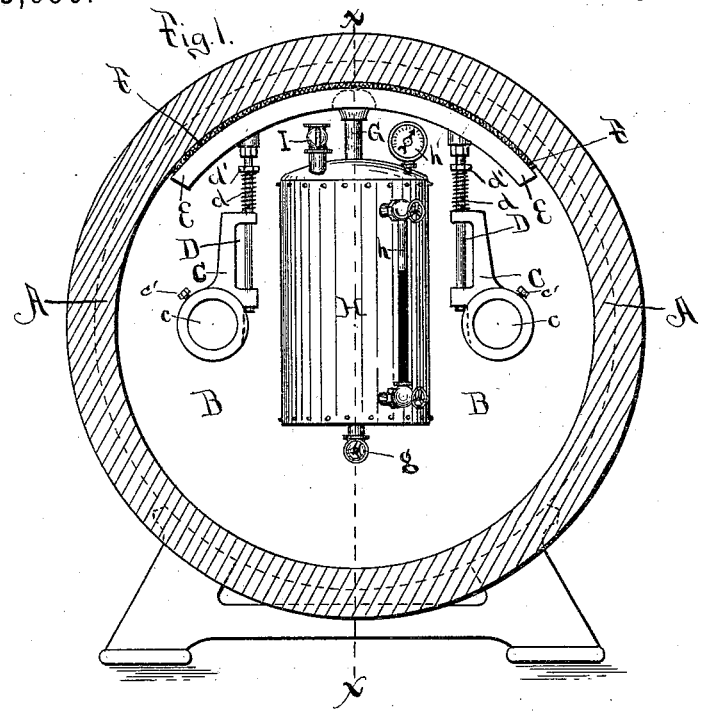
Figure 2:
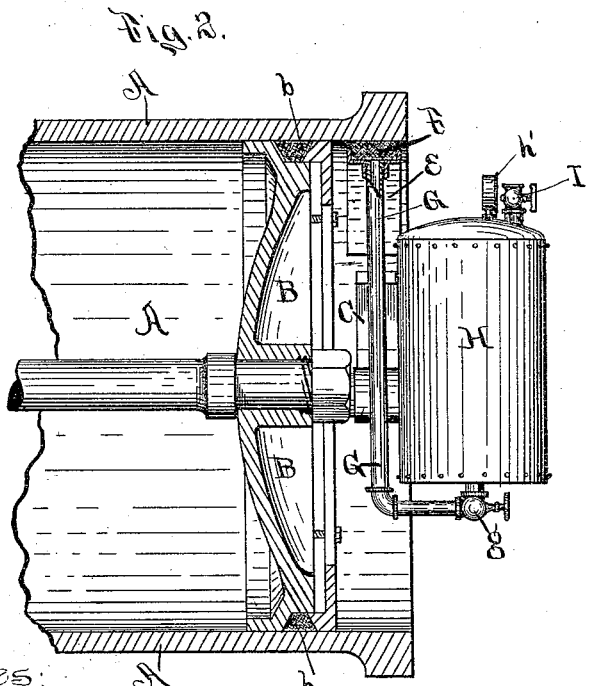

Figure 1 is a front elevation of a hydraulic cylinder provided with one of my lubricators. Fig. 2 is a vertical section on the line $x\ x$ of Fig 1, except that the oil-tank and conducting-pipe are shown in side view.

The object of my invention is to provide a lubricator for the cylinders of hydraulic elevators and other devices operating under similar conditions; and my invention consists in the devices and arrangements of parts hereinafter set forth and claimed.

In single-acting hydraulic motors for lubricators the stroke of the piston is not uniform, but may be short or long and may take place at any part of the cylinder; or, in other words, a series of short strokes may occur at either end of the cylinder or at any intermediate part thereof. These short strokes may be interspersed with longer strokes or with full strokes, having the ends of their motion between any two possible positions of the piston. Besides this, the elevator-cable is constantly stretching by use; metallic cables are constantly changing in length with changes of temperature, and hemp cables are constantly changing in length with changes of moisture of the air. Hence it is necessary to provide a lubricator which is operative at all times and in every position of the piston, and it is desirable to provide a lubricator to accomplish these purposes which can be easily and quickly attached to old motors without change thereof.

My lubricator is adapted to operate in any position of the piston in the cylinder and with any length of stroke. It may be attached to the piston-rod in cases where the rod is not immersed in fluid, or it may be attached to the piston itself, as shown in the drawings forming part hereof. It is always set in the cylinder on the dry side of the piston.

In the drawings, A represents the horizontal cylinder of a hydraulic elevator. B represents the piston thereof.

C C are brackets, which are attached to bosses or studs $c\ c$ upon the side of the piston next to the open end of the cylinder. These brackets are fastened to the said bosses in any suitable way, such as by the set-scews $c'\ c'$. In suitable bearings in the brackets are set vertical rods D D, which are longitudinally movable. These rods above the brackets bear nuts $d'\ d'$, between which and the adjacent portion of the brackets are coiled springs $d\ d$. Upon the upper ends of these rods D D is fastened a trough-like support E. This support extends through nearly or quite one-third of the inner circumference of the cylinder. In this support or trough E is placed a mass of suitable material F, such as felt or other absorbent substance. This constitutes an oil-lubricator.

By means of the rods D D and springs $d\ d$ the trough E and the absorbent F are kept vertically pressed against the upper one-third of the inner circumference of the cylinder, and as fast as the absorbent F wears away the spring takes up such wear. The trough containing the absorbent is thus pressed throughout its length against the inner surface of the cylinder, and the trough being inflexible causes an even pressure upon the absorbent through which the oil is fed and an even wear of the absorbent throughout its length and an even distribution of oil from the absorbent. The pressure of the absorbent F against the cylinder is adjusted by the nuts $d'\ d'$.

The absorbent, such as felt, is porous and compressible, and the more compressed it is the less porous to the passage of the lubricant, as oil. The quantity of lubricant fed to the cylinder is or can be regulated by the compression of the absorbent within the trough, and between the latter and the cylinder, and the consequent reduction of the freedom of the passage of lubricant into the trough and the absorbent is dependent in my device upon the compression of the springs $d$ by the nuts $d'$.

To the middle of the bottom of the trough E, or, in other words, at the highest point of the bottom, (see the figures,) is fastened a conducting-pipe G, from which pipe there is a free opening into the bottom of the trough E at the point of connection. The pipe G depends from the point of connection with the trough, and, as shown in Fig. 2, turns outward and extends to a proper distance, so that an oil-tank H may be fastened thereon, to the bottom of which tank the pipe is connected. The tank is thus supported by the brackets C C, through the rods D D, trough E, and conducting-pipe G. The springs $d\ d$ must be of sufficient strength to support the tank when filled and to press the absorbent F against the inner surface of the cylinder. The tank, however, may be fixed directly to the brackets C C, or to an independent bracket attached to the piston B. The tank H is provided with an indicator-glass $h$, and a pressure-gage $h'$, and also with an inlet I, which may be closed by a cock or valve.

The operation of this device is as follows: A quantity of oil is introduced into the tank H through the inlet I. The cock $g$ in the conductor-pipe G is then closed, and a quantity of air is forced into the tank and is compressed in the tank until the pressure rises to a suitable point, say, to five or more pounds to the square inch. Any suitable means of obtaining pressure on the oil sufficient to force it into the trough may be used instead of the air-pressure—e.g., water or steam pressure, or a weighted piston on the oil. When the air is sufficiently compressed, the cock or valve in the inlet I is turned to close the same, the outlet-cock $g$ or other suitable regulating device is opened and the oil will be constantly forced through the conductor-pipe into the absorbent F, lying in the trough E. If, now, the piston moves in the cylinder, the whole lubricating device will follow the movement of the cylinder and the absorbent F will move to and fro with the piston, oiling all the surface with which it comes in contact. The packing $b$ in the piston B will absorb and spread more or less of the oil, and some of the oil in the absorbent F will flow down the inner sides of the cylinder and will be spread by the piston over the whole surface of the cylinder from top to bottom. If the air-pressure should become low it may of course be easily increased or renewed.

In hydraulic motors for elevators the water is supplied on one side only of a piston under heavy pressure, and the piston-packing is made so tight and consequently solid that it cannot absorb lubricating-oil. Under these circumstances a device for feeding and distributing oil to the cylinder outside of the piston is necessary. In these motors the stroke of the piston is very long, in many cases being fully fifteen or twenty feet, and it therefore becomes necessary to provide a tank-oiler adapted to follow the piston within the cylinder. These results are accomplished by my lubricator. My lubricator is also easy to remove from the cylinder in order to make repairs, either of the piston or of the lubricator, and the removal is quickly accomplished. The motor may still be operated while the lubricator is removed. My device is also easily and quickly applicable to the piston of any horizontal hydraulic cylinder without changing the construction of the latter, and it is not necessary to construct the piston or cylinder with reference to the lubricator.

What I claim is—

1. The combination of a cylinder, a piston, a lubricant trough arranged circumferentially in the cylinder, an absorbent in said trough, means for pressing the trough throughout its length by a constantly self-adjusting pressure against the cylinder, a lubricant tank, and a conductor pipe connecting the tank and the trough.

2. The combination of a cylinder, a piston, a lubricant trough arranged circumferentially in the cylinder, an absorbent in said trough, adjustable spring supports for pressing the trough throughout its length, by a constantly adjusted pressure against the cylinder, a lubricant tank, and a conductor pipe for connecting the tank and the trough.

3. The combination of a cylinder, a piston, a lubricant trough arranged circumferentially in the cylinder, an absorbent in the trough, self-adjusting supporting devices fixed to the piston and to the trough for constantly retaining the trough, throughout its length, in contact with the cylinder, a lubricant tank moving with the piston, and a conductor pipe connecting the trough and the tank.

4. The combination of a cylinder, a piston, a lubricant trough arranged circumferentially in the cylinder, an absorbent in the trough, self-adjusting supporting devices fixed to the piston and to the trough for constantly retaining the trough, throughout its length, in contact with the cylinder, a lubricant tank moving with the piston, a conductor pipe connecting the trough and the tank, and means for forcing the lubricant from the tank to the trough.

5. In a cylinder lubricator, the combination of a horizontal cylinder, a piston, an oil trough supported by the piston or piston rod and arranged in the upper part of the cylinder, a compressible absorbent in the trough, one or more spring supports fixed to the piston and to said trough for pressing the trough, throughout its length, and the absorbent, against the upper part of the cylinder, an oil tank moving with the piston and adapted to pass within the cylinder, a conductor pipe connecting the trough and the tank and supporting the tank, and means of forcing the oil from the tank to the trough, substantially as described.

6. In a cylinder lubricator, the combination of a horizontal cylinder, a piston, an oil trough circumferentially arranged in the upper part of the cylinder, an absorbent in the trough, a rod or rods fixed to the trough and passing through brackets attached to the piston, springs pressing said rods in one direction and thereby pressing said absorbent, throughout its length, against the upper side of the inner surface of the cylinder, an oil tank, a conductor pipe having a regulating device therein and connecting the tank and trough and supporting the tank, and means of forcing the oil from the tank into the trough substantially as described.

7. In a cylinder lubricator, the combination of a horizontal cylinder, a piston, a trough supported by the piston or piston rod and circumferentially arranged in the upper part of the cylinder, a compressible absorbent in the trough, means for pressing the trough, throughout its length, and the absorbent, against the upper part of the cylinder, a tank, and a conductor pipe connecting the trough and the tank.

8. In a cylinder lubricator, the combination of a horizontal cylinder, a piston, a trough supported by the piston or piston rod and circumferentially arranged in the upper part of the cylinder, a compressible absorbent, as felt, in the trough, means for constantly and adjustably pressing the trough, throughout its length, and the absorbent, against the upper part of the cylinder, a tank supported to move with the piston, a conductor pipe connecting the trough, and the tank, and means for forcing the lubricant from the tank to the trough.

9. In a cylinder lubricator, the combination of a horizontal cylinder, a piston, a trough supported by the piston or piston rod and circumferentially arranged in the upper part of the cylinder, a compressible absorbent, as felt, in the trough, means for constantly and adjustably pressing the trough, throughout its length, and the absorbent against the upper part of the cylinder, a tank supported to move with the piston, a conductor pipe connecting the trough and the tank, and constituting a free passage for feeding the lubricant from the tank to the trough, and means for forcing the lubricant from the tank to the trough.

EMANUEL MAJOR.

Witnesses:
  A. N. BOWMAN,
  M. H. MCMATH.